United States Patent
Büttner et al.

(10) Patent No.: US 12,074,484 B2
(45) Date of Patent: Aug. 27, 2024

(54) COMPONENT FOR AN ELECTRIC MACHINE WITH A POLYMER COATING, AND METHOD FOR COATING A COMPONENT

(71) Applicant: Innomotics GmbH, Nuremberg (DE)

(72) Inventors: Klaus Büttner, Hollstadt (DE); Tobias Katzenberger, Bad Königshofen (DE); Klaus Kirchner, Ostheim (DE); Bastian Plochmann, Neustadt an der Aisch (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 252 days.

(21) Appl. No.: 17/786,873

(22) PCT Filed: Dec. 14, 2020

(86) PCT No.: PCT/EP2020/085959
§ 371 (c)(1),
(2) Date: Jun. 17, 2022

(87) PCT Pub. No.: WO2021/122450
PCT Pub. Date: Jun. 24, 2021

(65) Prior Publication Data
US 2023/0032311 A1    Feb. 2, 2023

(30) Foreign Application Priority Data
Dec. 20, 2019    (EP) .................................... 19218458

(51) Int. Cl.
*H02K 5/10*    (2006.01)
*B05D 5/10*    (2006.01)
(Continued)

(52) U.S. Cl.
CPC .......... *H02K 15/0056* (2013.01); *B05D 5/10* (2013.01); *H02K 1/16* (2013.01); *H02K 3/50* (2013.01); *H02K 5/04* (2013.01)

(58) Field of Classification Search
CPC ........ H02K 15/0056; H02K 1/16; H02K 3/50; H02K 5/04; B05D 5/10
(Continued)

(56) References Cited

U.S. PATENT DOCUMENTS

| 4,219,748 A | 8/1980 | Sakaguchi et al. |
| 2021/0313865 A1* | 10/2021 | Buttner et al. ..... H02K 15/0081 |

FOREIGN PATENT DOCUMENTS

| DE | 26 06 401 A1 | 9/1976 |
| FR | 22 16 339 A1 | 8/1974 |

(Continued)

OTHER PUBLICATIONS

PCT International Search Report and Written Opinion of International Searching Authority mailed Mar. 5, 2021 corresponding to PCT International Application No. PCT/EP2020/085959 filed Dec. 14, 2020.

*Primary Examiner* — Terrance L Kenerly
(74) *Attorney, Agent, or Firm* — Henry M. Feiereisen LLC (57) ABSTRACT

A component for an electric machine includes a flat region in which an electric line runs when the component is integrated into the electric machine and which includes a sharp-edged structure. A polymer layer adheres to the flat region without further aid such as to mask the sharp-edged structure and thereby protect from damage the electric line on the flat region. The polymer layer is made of cured plastic adhesive and jetted onto the flat region in the form of threads, such that the threads are spin-coated on top of one
(Continued)

another in the form of overlapping loops and form a network structure which spans the sharp-edged structure.

20 Claims, 7 Drawing Sheets

(51) Int. Cl.
  *H02K 1/16* (2006.01)
  *H02K 3/50* (2006.01)
  *H02K 5/04* (2006.01)
  *H02K 15/00* (2006.01)

(58) Field of Classification Search
  USPC .......................................................... 310/195
  See application file for complete search history.

(56) References Cited

FOREIGN PATENT DOCUMENTS

| | | |
|---|---|---|
| JP | S5791647 A | 6/1982 |
| WO | WO 2018-099746 A1 | 6/2018 |

* cited by examiner

FIG 11

COMPONENT FOR AN ELECTRIC MACHINE WITH A POLYMER COATING, AND METHOD FOR COATING A COMPONENT

CROSS-REFERENCES TO RELATED APPLICATIONS

This application is the U.S. National Stage of International Application No. PCT/EP2020/085959, filed Dec. 14, 2020, which designated the United States and has been published as International Publication No. WO 2021/122450 A1 and which claims the priority of European Patent Application, Serial No. 19218458.8, filed Dec. 20, 2019, pursuant to 35 U.S.C. 119(a)-(d).

BACKGROUND OF THE INVENTION

The invention relates to a component for an electric machine, in particular a rotary electric machine, wherein the component comprises at least one polymer layer arranged on at least one flat region of the component.

The invention additionally relates to an electric machine with at least one such component.

The invention also relates to a method for creating a polymer layer adhering to at least one flat region of a component of an electric machine.

In many electric devices, for example electric motors, regions exist, for reasons related to production and design, on which lines run. Often the existence of such regions is associated with certain disadvantages and risks.

For example, electric motors often have regions in which the device shell or walls are perforated, in order to be able to skew electric lines in the further assembly. A classic example of this is an electric motor which is connected at the customer's site via what is known as the terminal board in the terminal box. This is normally attached at a particular point of the housing and is connected thereto by means of a housing recess. The assembly, leadout and connection of the lines take place manually through the aforementioned recess, which because of the nature of the process must have corresponding dimensions. The motor as such should then be passivized against contamination, such as for example discarded connecting parts, moisture and dust, as a result of which the connection to the terminal board represents a weak spot, since the terminal box should be accessible at all times by the customer.

To be able to seal the leadthrough, prefabricated foam parts can for example be inserted manually. This process is intensive in terms of time and cost and it calls for a high degree of meticulousness, in order to carry it out. When requirements are more stringent the region must initially be masked precisely and then potted with a reactive resin. The curing of the resin takes place at room temperature over several days. Because of the preparation and follow-up work for the potting, this is a very complex process.

Industrial motors in the low-voltage range are a further example of electric devices. These are manufactured with a round-wire winding, which is initially wound in an automatic winding machine in coil form and is then fed into stator slots, After the process of feeding the winding, the wire ends at the end of each coil, which can for example be embodied as round wires or enameled wires, of all (for example three) phases are positioned in any manner on the connection side of the motor. Depending on the desired circuit, several wires can then be connected in parallel and routed away from one of the winding overhangs (usually from a winding overhang on the connection side) as connection lines. For example, there can be a total of six connection lines—three phases, each with two ends. The connection lines emerge undefined from the winding overhang and must all be routed to one side so that they can be routed through the provided recess into the terminal board of the motor after assembly of the housing. To do this, the lines are positioned radially onto the end winding of the winding overhang, where they are fixed.

The fixing in this region currently takes place manually by means of what are known as grid bands. In this case the lines are bound to the winding overhang with binding bands. The manual manufacturing step is a factor here in terms of time and cost.

In addition, electric devices normally comprise a housing or components which for reasons related to production have regions with sharp edges. Examples of these include metal cast housings or—in the case of an electric motor—the stator laminated cores or rotor laminated cores, in which many individual laminations are stacked on top of one another and represent very sharp-edged structures. Additional sharp-edged regions can be created as a result of further machining, such as for example milling or drilling. In most cases the necessary wiring (for example in an electric motor: insertion/feed-in of the windings, installation of the connection lines) is not installed in the prefabricated workpiece until afterwards. It is essential to ensure here that the line insulation or the line itself do not suffer any damage. This is the case for example when feeding in and making the terminal connections of the lines of the electric motor on the terminal board thereof. Furthermore, mechanical stress and consequently position changes and vibrations of the lines inevitably occur during operation, as a result of which additional measures for protecting the components against sharp edges and burrs are desirable.

One possible approach to countering the problem consists in using higher-quality materials (for example more mechanically resilient cable insulation) or in more delicate process control (often a high proportion of manual labor). As well, additional edge-protection inserts may be installed. These inserts are prefabricated and are positioned or glued by hand at critical points/regions. The sharp-edged regions can also be debarred in a manual step.

The object of the invention is to resolve the disadvantages described above of the prior art in a universal manner.

SUMMARY OF THE INVENTION

The object related to the device is achieved according to the invention with a component of the aforementioned type, in that the polymer layer comprises cured plastic adhesive and adheres to the flat region, wherein at least one electric line runs on the at least one flat region at least when the component is integrated into the electric machine.

The object related to the method is achieved according to the invention with a method of the aforementioned type, in that a thread of a thermoplastic hot melt adhesive is created by means of a nozzle, and during the creation the nozzle is moved such that because of the travel of the nozzle the thread is applied onto the flat region in layers and covering the whole area.

In connection with the present invention the term "adhering polymer layer" is to be understood as a polymer layer that adheres to the material of the flat region without adhesive. This means in particular that no further adhesive layer is provided to enable the polymer layer to adhere to the flat region, for example as an intermediate layer, instead, the polymer layer adheres to the flat region by itself without further aids.

The cured plastic adhesive and thus the polymer layer is preferably non-adhesive and/or non-porous.

In a preferred form of embodiment it can be provided that precisely one polymer layer adheres to the flat region and the polymer layer consists of the cured plastic adhesive.

It can furthermore be expedient if the polymer later is created by jetting or spin-coating or spraying the plastic adhesive onto the flat region. As a result, the polymer layer can assume any shape. The shape and size of the layer can be varied.

In a preferred form of embodiment the polymer layer can have a thickness of approximately 0.1 mm to 3 mm, preferably between 0.5 mm and 1.5 mm, for example approximately 1.0 mm.

In a preferred form of embodiment the component can be embodied as a stator, wherein the at least one flat region is arranged at an end winding of a winding overhang of the stator arranged on the connection side, wherein a section of the at least one electric line lies on the flat region and is fixed to the winding overhang by the polymer layer.

In this case it can advantageously be provided that the section is covered by the polymer layer.

In addition, it may be expedient if the polymer layer consists of the cured plastic adhesive, wherein the plastic adhesive is jetted in the form of threads onto the flat region containing the section lying thereon of the at least one electric line, such that the threads are spin-coated on top of one another in the form of overlapping loops and form a network structure. A network structure such as this can for example be stretched over an aperture, such as for example a cable leadthrough.

The threads can in this case have a diameter of approximately 50 µm to 500 µm, for example 100 µm to 400 µm, in particular 200 µm to 300 µm.

In a preferred form of embodiment it can be provided that the at least one flat region has at least one sharp-edged structure, wherein the at least one sharp-edged structure is covered with the polymer layer adhering thereto, in order to protect from damage the at least one electric line running—at least when the component is integrated into the electric machine—on the at least one flat region. Because the sharp-edged structure is covered by the polymer layer, the line running on the flat region cannot come into contact with the sharp-edged structure and is protected from damage, in particular when the machine is in operation.

It can be expedient in this case for the polymer layer to consist of the cured plastic adhesive, wherein the plastic adhesive is jetted onto the flat region in the form of threads, such that the threads are spin-coated on top of one another in the form of overlapping loops and form a network structure which spans the at least one sharp-edged structure.

It can be provided that the component is embodied as a stator or a rotor or a housing.

Surprisingly good results can be achieved if the plastic adhesive is a thermoplastic hot melt adhesive, for example a polyolefin or a polyamide.

The object of the invention is also achieved with an electric machine, preferably with a rotary electric machine, with at least one aforementioned component.

In a preferred form of embodiment of the electric machine it can be provided that the component is embodied as a (machine) housing, and the flat region is embodied as a region of the housing with at least one aperture, wherein the at least electric line runs through the at least one aperture, wherein the polymer layer comprising the cured plastic adhesive spans and seals the at least one aperture and adheres both to the at least one electric line and to the housing.

The object of the invention Is also achieved according to the invention with a method mentioned in the introduction, in that the component is provided, wherein at least when the component is integrated into the electric machine at least one electric line runs on the at least one flat region, wherein by means of a nozzle a thread of a thermoplastic hot melt adhesive is created, and during the creation the nozzle Is moved such that because of the travel of the nozzle the thread is applied onto the flat region in layers and covering the whole area.

In a preferred form of embodiment it can be provided that the at least one flat region has at least one sharp-edged structure and because of the travel of the nozzle the thread is applied onto the flat region in layers and covering the whole area, such that the thread is spin-coated on in the form of overlapping loops, in order to form a network structure, wherein the network structure spans the at least one sharp-edged structure, in order to protect from damage the at least one electric line running—at least when the component is integrated into the electric machine—on the at least one flat region.

In a preferred form of embodiment of the inventive method it can be provided that the travel comprises a rotary movement and a lateral movement.

In a preferred form of embodiment of the inventive method it can be provided that the thread is applied in the form of slings. In particular the thread, which has not yet been positioned onto the flat region, can form an approximate 3D helix between the nozzle outlet and the flat region.

Thanks to the rotation of the primary adhesive thread and a lateral movement of the spray head a structure like a spider's web can be created on the substrate surface, which if the layer is sufficiently duplicated can for example fuse together non-porously.

The thread-like adhesive can form an overlapping spray pattern thanks to its surface tension, even on very richly contoured substrate surfaces. The sprayed-on layer can form an overlay similar to an adhesive film on the surface.

It can also advantageously be provided that the thermoplastic hot melt adhesive is fed to the nozzle at an operating pressure of between 1 bar and 10 bar.

Further advantages can emerge if the thermoplastic hot melt adhesive is fed to the nozzle at an operating temperature of between 180° C. and 220° C.

In a preferred form of embodiment it can be provided that the application of the thermoplastic hot melt adhesive takes place fully automatically, in particular using a robot.

BRIEF DESCRIPTION OF THE DRAWING

Further features, properties and advantages of the present invention emerge from the following description with reference to the accompanying figures, in which, shown schematically.

DETAILED DESCRIPTION OF PREFERRED EMBODIMENTS

In the exemplary embodiments and figures identical or identically acting elements can each be provided with identical reference characters.

Figure 1:
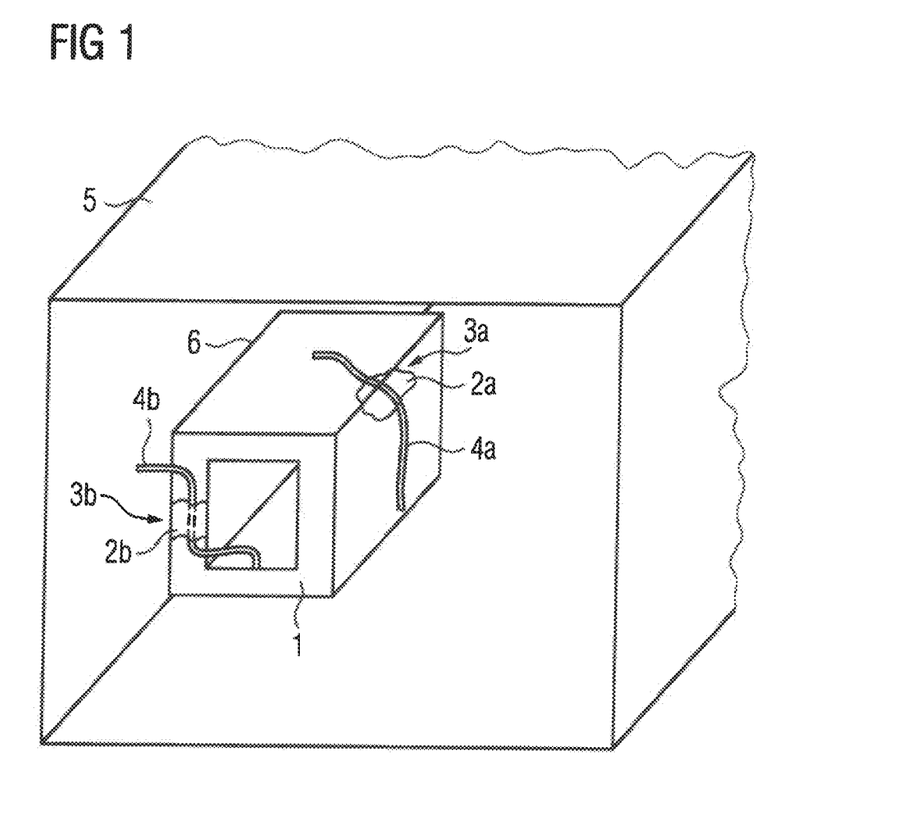
FIG. 1 shows a component integrated into an electric machine.

FIG. 1 schematically shows a component 1 that is integrated into an electric machine 5. The component 1 can comprise multiple polymer layers 2a, 2b adhering to corresponding flat regions 3a, 3b of the component 1. The polymer layers 2a, 2b comprise cured plastic adhesive. At least when the component 1 (as shown in FIG. 1) is integrated into the electric machine 5 at least one electric line can run 4a, 4b on the respective flat regions. FIG. 1 shows a form of embodiment in which an electric line is provided for each region.

It can be seen in FIG. 1 that the flat regions 3a, 3b are completely covered by the corresponding polymer layers 2a, 2b.

The electric lines (for example 4b) can for example be fastened to the corresponding region (for example 3b) partially beneath the polymer layer (for example 2b) and by this polymer layer that adheres to the component 1.

The flat regions (for example 3a) can have an edge 6. Component 1 may be provided with such edges 6 for reasons related to production. The edges 6 can be so sharp that they pose a hazard for the electric lines 4a running at these edges 6, if they touch the edges 6 during insertion/feeding-in or due to vibrations during operation of the electric machine 5 and for example damage the insulation thereof.

The polymer layer can for example be non-porous.

The electric lines 4a, 4b can for example be connection lines power lines or sensor signal lines.

The polymer layers 2a, 2b can for example consist of the cured plastic adhesive. For example, thermoplastic hot melt adhesive, for example polyolefin or polyamide, can be used. Specifically, good results have been achieved with the materials 3M Scotch Weld 3731, 3789 and 3779 from the company 3M, wherein the first material mentioned is a polyolefin and both the other materials are polyamides.

The polymer layers 2a, 2b can also comprise RT-curing (RT=room temperature, approximately 25° C.) cured adhesives or be formed from these. The plastic adhesive used can include a thread reinforcement. The polymer layers 2a, 2b can be formed by spraying the plastic adhesive on and for example take the form of a spray-on wallpaper. The plastic adhesive can be chemically curing, so for example duromer plastics can be used, which for example are UV-curing. Physically curing plastics can be used as plastic adhesive. Filled plastics (threads, particles) can be used as plastic adhesive, provided they can still be applied, for example in the form of a spray-on wallpaper. Solvent-based plastics can also be used as plastic adhesive, which solidify by evaporation of the solvent (for example hairspray, PVA), Reactive resins (for example epoxy, PEI, PU) can be used as plastic adhesive.

The component can be embodied as a stator of an electric machine, for example a rotary electric machine.

Figure 2:
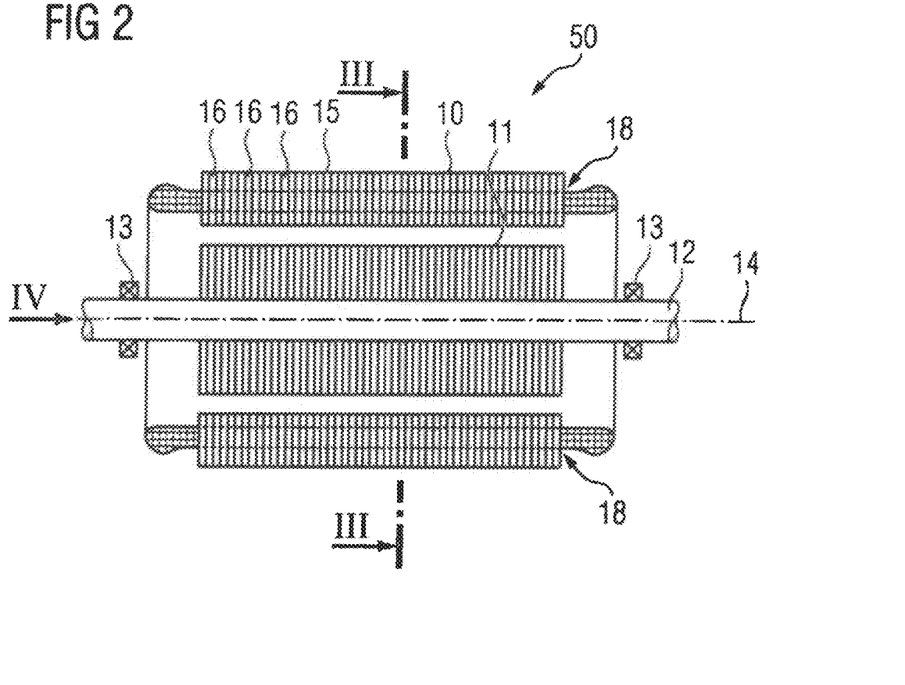
FIG. 2 shows a rotary electric machine.

FIG. 2 shows by way of example a rotary electric machine 50 which has a stator 10. The electric machine can in individual cases be embodied as a linear electric machine. The rotary electric machine 50 can also have a rotor 11 in addition to the stator 10. In the case of a rotary electric machine the rotor 11 is rotatably arranged on a rotor shaft 12, which in turn is rotatably mounted in bearings 13. As a result the rotor shaft 12 and the rotor 11 can be rotated about an axis of rotation 14. Other components of the electric machine 50 that are normally present, such as for example bearing shields, are not illustrated in FIG. 1.

The stator 10 has a laminated core 15 with a plurality of individual stator laminations 16. Only a few of the stator laminations 16 are provided with their reference character in PG 1, in order not to unnecessarily overload FIG. 1. The laminated core 15 is manufactured in the conventional manner and hence need not be explained in greater detail.

Figure 3:
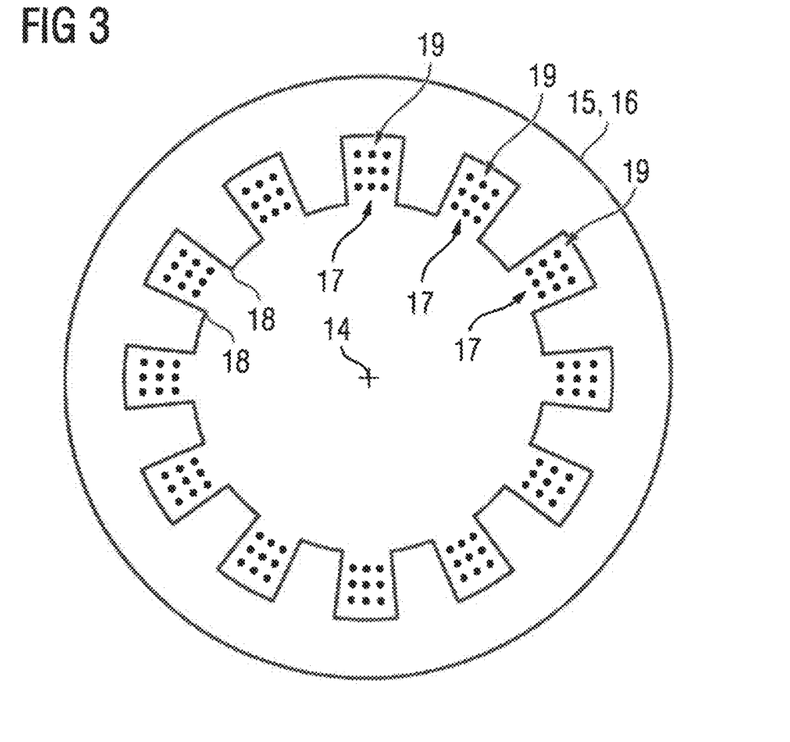
FIG. 3 shows a section through the laminated core of the rotary electric machine in FIG. 2.

FIG. 3 shows a section through the laminated core 15. It can in particular be seen in FIG. 3 that slots 17 are made in the laminated core 15. The slots 17 can—as is standard practice—be made in the laminated core 15 by the stator laminations already being correspondingly punched out. The aforementioned edges 18, which can be particularly sharp, can arise during the punching-out process. Only some of these sharp edges of the slots 17 are provided with their reference character in FIG. 3.

Windings 19 of a stator winding system are inserted into the slots 17. The windings 19 can form a multiphase stator winding system, for example a three-phase stator winding system. The windings 19 of the individual phases are generally inserted into the slots 17 sequentially one after the other. The insertion of the windings 19 as such takes place in the conventional manner and hence need not be explained in greater detail. The windings 19 can if required be embodied as what are known as wild windings or laid windings.

In this case regions of the edges 18 which come into contact with the windings 19, or may do so, can be provided with a polymer layer adhering to these regions and comprising a cured plastic adhesive, such that direct contact between the windings 19 and the edges 18 is prevented, as a result of which the windings 19 are protected from damage.

Figure 4:
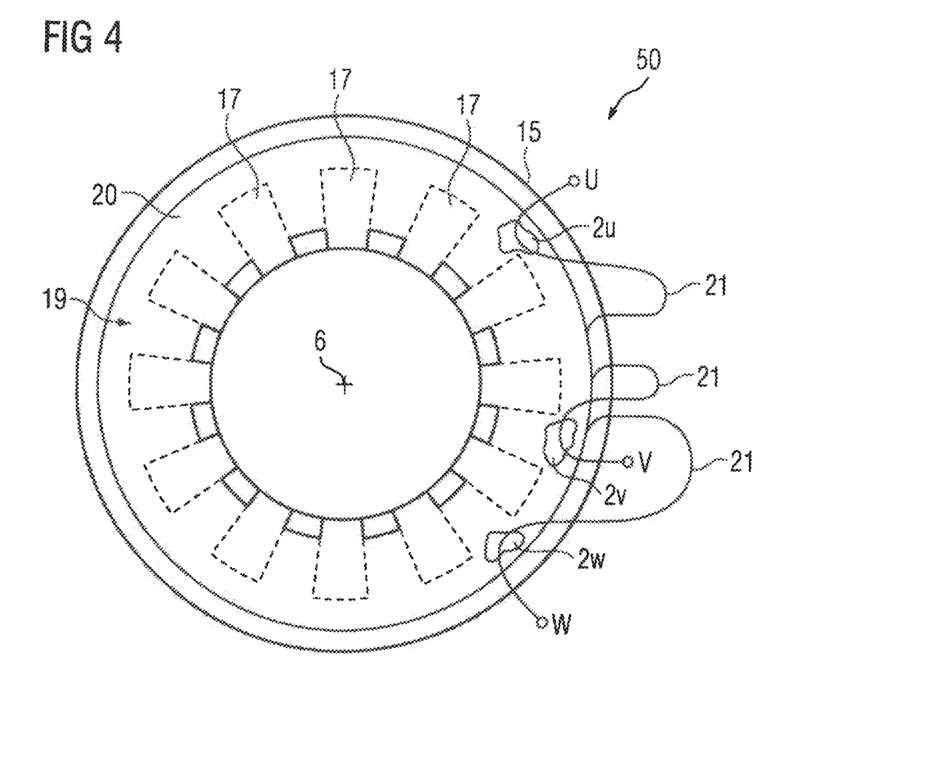
FIG. 4 shows a connection-side winding overhang of the rotary electric machine in FIG. 2.
Figure 5:
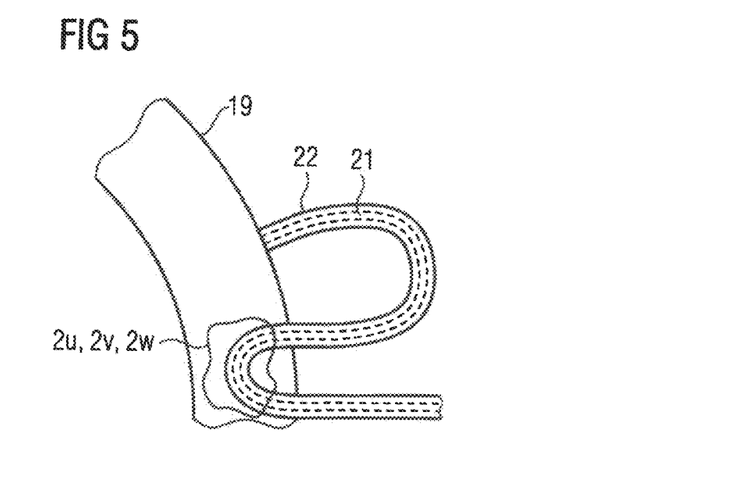
FIG. 5 shows an enlarged view of FIG. 4.

FIG. 4 shows one of the two winding overhangs of the electric machine 50—namely the connection-side winding overhang 20. It is expedient if the connection-side winding overhang 20 of the electric machine 50 is located where a terminal board is provided in the housing 23 (see FIG. 6) of the electric machine 50.

In accordance with FIG. 4 the windings 19 can have winding ends in the region of the connection-side winding overhang 20, which can form electric lines (here: connection lines) 21 for a three-phase system, for example. Supply voltages, for example the supply voltages U, V, W of a three-phase system, can be applied to the electric lines 21 during operation of the electric machine 50.

It can be seen from FIG. 4 that the electric lines 21 (round wires, enameled wires) can for example be positioned radially onto the end winding of the connection-side winding overhang 20 and fixed there. The lines 21 can be fastened respectively with a corresponding polymer layer 2u, 2v, 2w to the corresponding region of the end winding of the connection-side winding overhang 20. In this case the polymer layer 2u, 2v, 2w can cover a section of the respective line 21 like a wallpaper and fix this thereto by adhesion to the end winding of the winding overhang 20.

The polymer layers 2u, 2v, 2w can consist of the cured plastic adhesive. In this case the plastic adhesive can be jetted in the form of threads onto the flat region of the end winding of the winding overhang 20 containing the section lying thereon of the at least one electric line 21, such that the threads are spin-coated on top of one another in the form of overlapping loops and form a network structure. The threads can have a diameter of approximately 50-500 μm.

The electric lines 21 may have only one insulating coating in the form of an insulating enamel. The insulating coating is not illustrated in the figures. This insulating coating could be very easily damaged when the lines 21 are handled, if the lines 11 are handled as they are. For reasons of electrical voltage safety and operating safety it may be expedient to sheathe the lines 21 with an insulator 22 as per the illustration in FIG. 6 and to fasten the One 21 sheathed with an insulator 22 to the end winding of the connection-side winding overhang 20 using the polymer layer 2u, 2v, 2w. The insulator 22 can include a thermoplastic hot melt adhesive or consist thereof.

Figure 6:
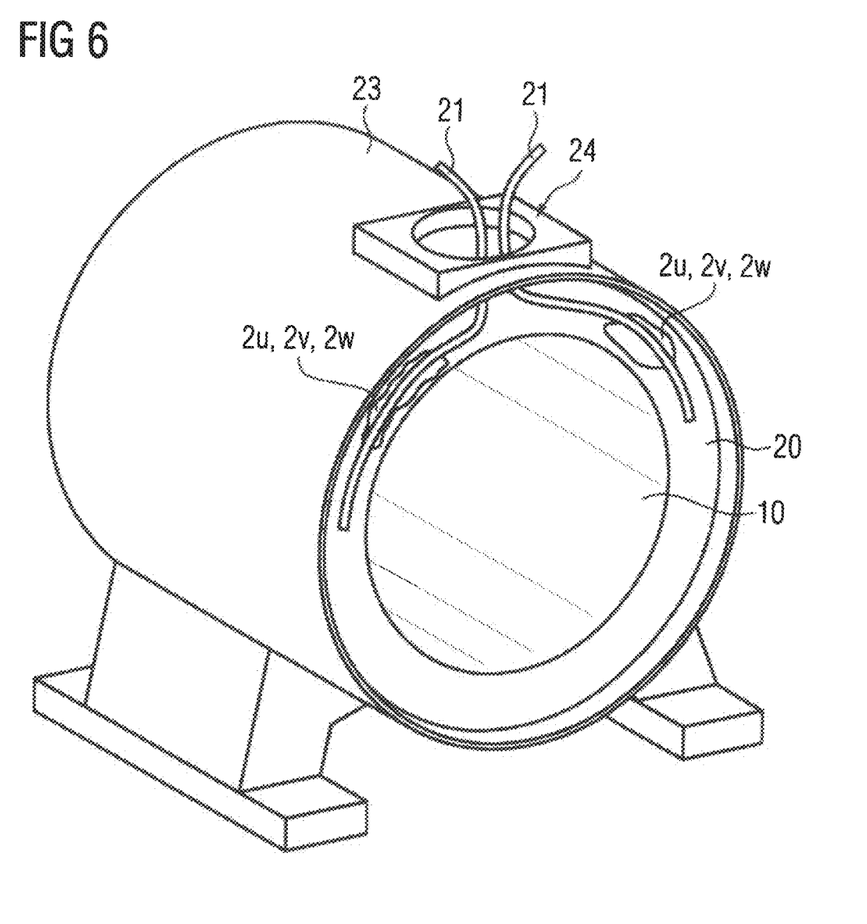
FIG. 6 shows a stator assembled into a housing.

The electric lines 21 may be sheathed over only part of their length (for example starting at the winding overhang 20 and ending shortly before the end of the respective line 21). The connection of the corresponding supply voltage U, V. W to the non-sheathed end of the respective electric line 21 can take place subsequently in a terminal box 24 (FIG. 6) of the electric machine 50, FIG. 6 shows the stator 10 assembled into a housing 23. For simplicity, only two electric lines 21 are shown in FIG. 6, which are fastened to the end winding layers adhering to the end winding. The electric lines 21 are routed into the terminal box 24 of the housing 23, in order to be connected there via a terminal board. In a three-phase system six connection lines, three phases with two ends each, can be fastened to the end winding of the winding overhang.

Figure 7:
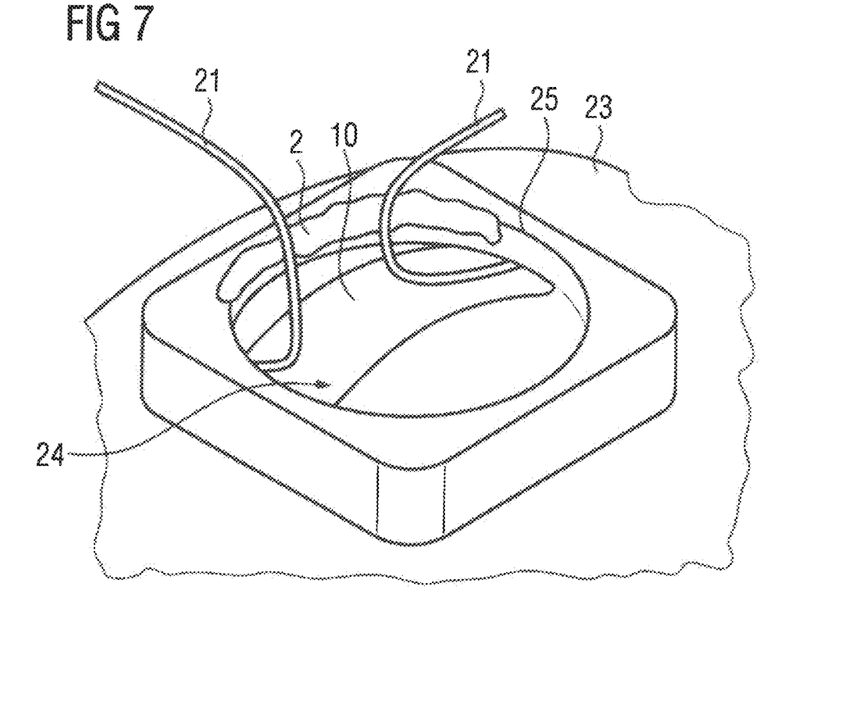
FIG. 7 shows an enlarged view of FIG. 6.

FIG. 7 shows an enlarged view of FIG. 6, which—in addition to the edges 18 described above—illustrates a further example in which the flat region has a sharp-edged structure. Specifically it is apparent from FIG. 7 that the structure can be embodied as an aperture edge 25 of the aperture of the terminal box 24. In particular it is apparent from FIG. 7 that at least one region of the aperture edge 25, which could come into contact with the Ones 21, is masked by a polymer layer 2 adhering to the housing material, in ogler to protect the electric lines 21 against damage.

The polymer layer can likewise consist of the cured plastic adhesive, which is jetted in the form of threads onto the region of the aperture edge 25, such that the threads are spin-coated on top of one another in the form of overlapping loops and form a network structure which spans at least the region of the aperture edge 25.

Figure 8:
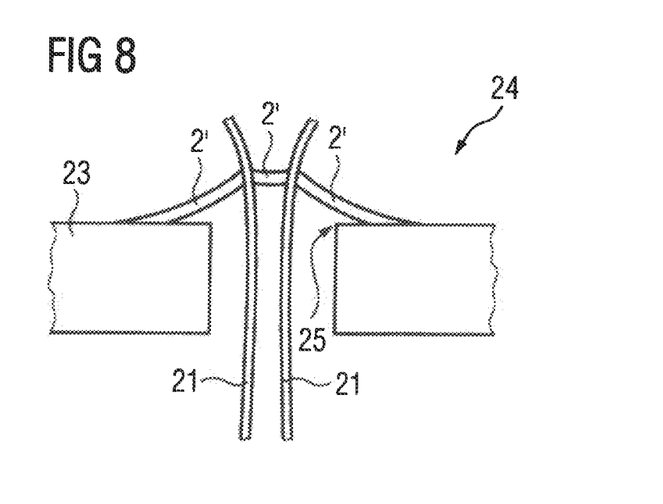
FIG. 8 shows a sectional view of a housing in the region of the terminal box.

FIG. 8 shows a sectional view of the housing 23 in the region of the terminal box 24. It is apparent from FIG. 8 that the flat region can include an aperture, for example an aperture in the terminal box 24 leading to the interior of the housing 23, The electric lines 21 can be fed through the aperture into the terminal box 24, wherein the aperture containing electric lines 21 laid through the aperture can be sealed by means of a polymer layer 2' that includes the cured plastic adhesive. In particular, the plastic can (for example in a form-fit manner) seal the aperture, which can be embodied as a cable leadthrough, in order to protect the interior of the electric machine 50 from moisture or dirt.

The polymer layer 2' can include the same materials as the aforementioned polymer layers 2a, 2b, 2u, 2v, 2w, 2 or can consist of the same materials. Such polymer layers can have a thickness of approximately 0.1 mm to 3 mm, preferably between 0.5 mm and 1.5 mm, for example approximately 1.0 mm.

It has been shown to be particularly advantageous to use thermoplastic hot melt adhesive as the material for forming the polymer layers, in particular the polymer layer 2' sealing the cable leadthrough.

Figure 9:
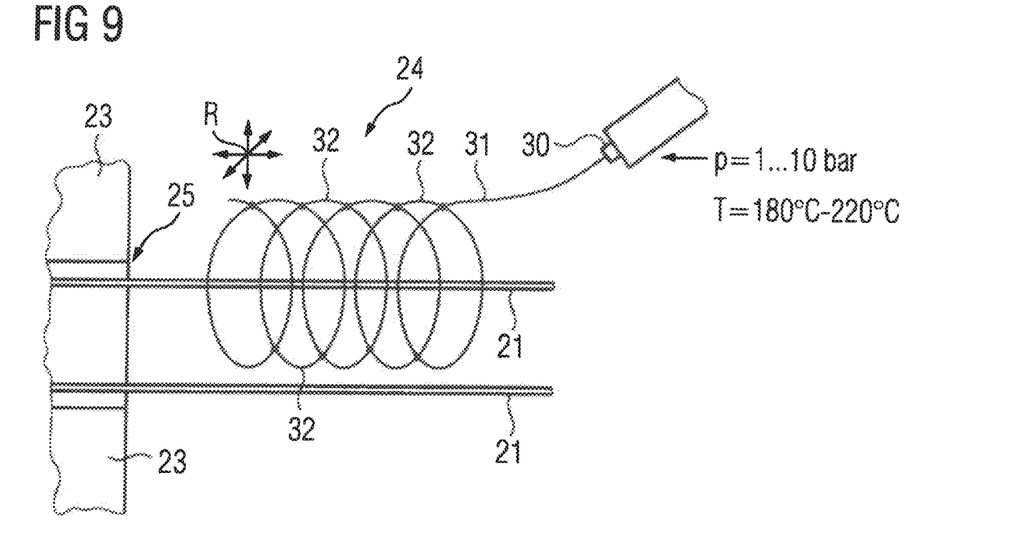
FIG. 9, 10 show threads of the thermoplastic hot melt adhesive when being applied to a flat region to create the polymer layer.

With reference to FIG. 9, an example is shown of a method for creating a polymer layer adhering to at least one flat region of a component of an electric machine. Thermoplastic hot melt adhesive is used in the method. At least the aforementioned polymer layers 2a, 2b, 2u, 2v, 2w, 2, 2' can be created using the method described below.

Specifically, FIG. 9 shows an example of creating the polymer layer 2" for sealing the cable leadthrough in the terminal box 24 of the housing 23. Naturally the method can also be used to create edge protection—if the flat region includes a sharp-edged structure—and/or to fasten electric lines 21 to a flat region, for example to the connection-side winding overhang 20.

In this case a thread 31 of a thermoplastic hot melt adhesive can be created by means of a nozzle 30. During the creation the nozzle 30 is moved such that because of the travel of the nozzle 30 the thread 31 is applied onto the flat region in layers and covering the whole area. In this case all three spatial degrees of freedom R are preferably exploited. The thread 31 can have a diameter for example in a range between 50 μm and 500 μm.

In one form of embodiment the thread 31 can be applied to the flat region in the form of slings 32. Particularly if the flat region includes the cable leadthrough, in other words an aperture, the application in the form of slings 32 is advantageous, because the hot melt adhesive spans the aperture much like a net.

Although FIG. 9 shows that one of the electric lines 21 runs through the slings 32 or through the 3D helix that is formed by the thread 31, the thread 31 can be spin-coated in any manner in order to seal the hollow spaces between the lines 21 and the cable leadthrough, as shown in FIG. 8.

Figure 10:
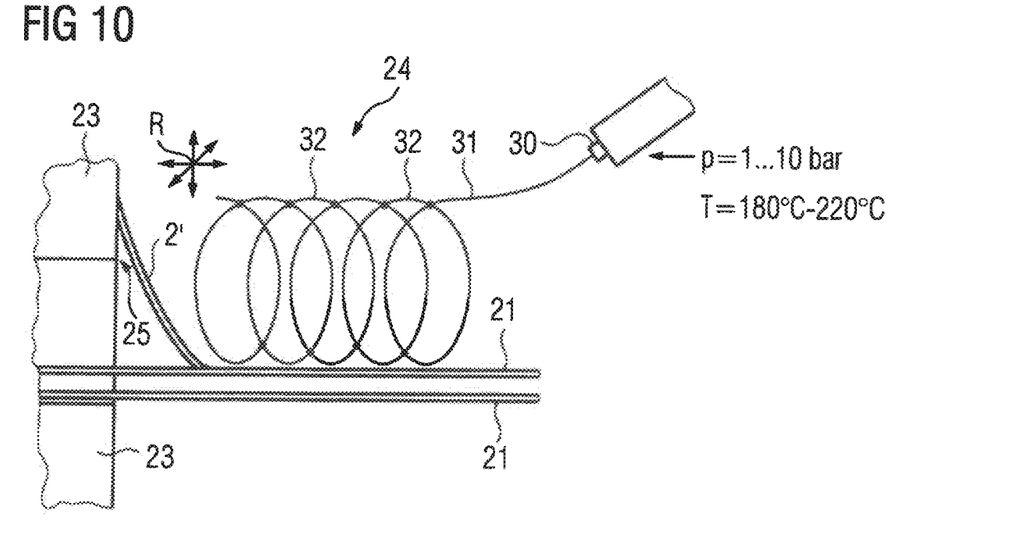

FIG. 10 shows how part of the cable leadthrough can be sealed, as well as a polymer layer 2' which on the one hand adheres to one of the electric lines 21 and on the other hand to the housing 23 and seals part of the cable leadthrough.

It is expedient if the thermoplastic hot melt adhesive is fed to the nozzle 30 at an operating pressure of between 1 bar and 10 bar, and/or at an operating temperature of between 180° C. and 220° C.

In a specific experiment an adhesive based on a polyolefin with a melting temperature of approximately 200° C. was used for example. The adhesive was jetted on at an operating temperature T of 220° C. and a pressure p of 3 bar. The adhesive exited the nozzle 30 at a velocity of approximately 5 m/s. The distance of the nozzle 14 from the respective flat region was approximately 8 cm, the speed of rotation of the nozzle 30 was 600 rpm. The slings 32 adhered very well to each of the aforementioned materials. In the case of the cable leadthrough the slings 32 resulted in the hollow spaces to be sealed being completely spanned.

The application of the thermoplastic hot melt adhesive can take place fully automatically.

Figure 11:
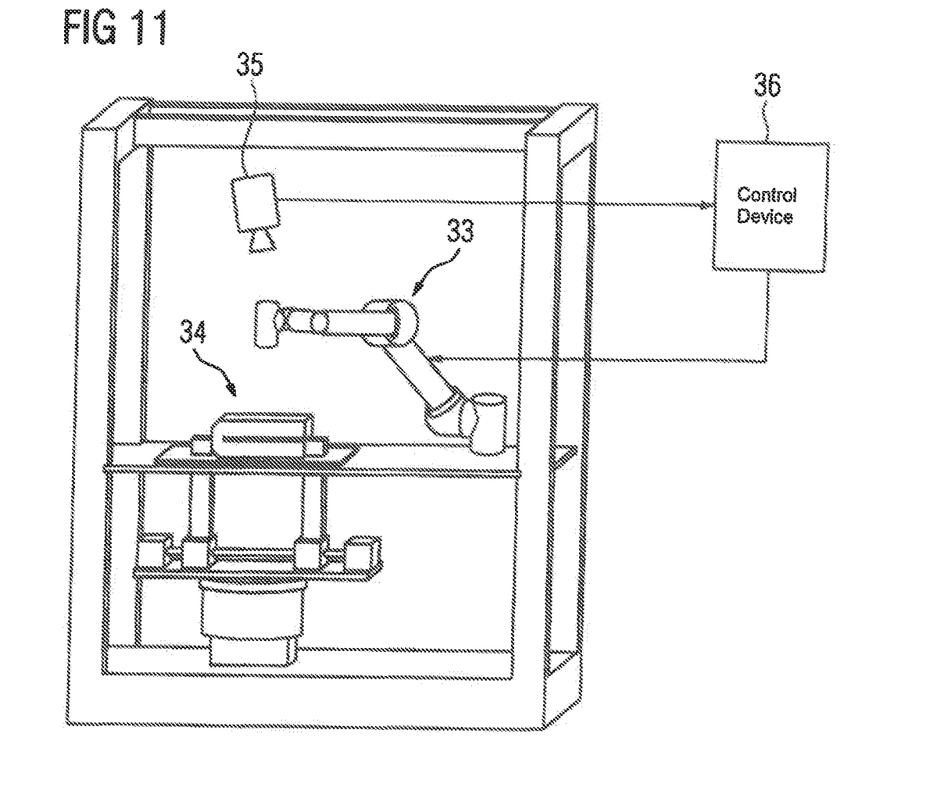
FIG. 11 shows fully automatic application of the plastic adhesive.

For example, in accordance with the illustration in FIG. 11 a corresponding manufacturing facility can have a robot 33, by means of when the jetting-on takes place. Depending on the way in which the component 1, 10 is fixed in a retaining device 34 of the manufacturing facility it is possible for the flat regions 3a, 3b to each be situated at defined locations. In addition it is conceivable for the manufacturing facility to have an optical detection system 35, by means of which the location and the course of the flat region to be sprayed can be detected prior to the thermoplastic hot melt adhesive being jetted. The optical detection system 35 can for example be embodied as a 3D camera. In the case of an optical detection the detected location and the detected course of the flat regions can be fed to a control device 36. The control device 36 is thereby accordingly able to take into account the detected location and the detected course of the flat regions 3a, 3b to be sprayed during the travel of the nozzle 30.

Although the invention has been illustrated and described in greater detail by preferred exemplary embodiments, the invention is not restricted by the disclosed examples. Variations can be derived therefrom by the person skilled in the art, without departing from the scope of protection of the invention, as is defined by the following claims.

What is claimed is:

1. A component for an electric machine, comprising:
a flat region in which an electric line runs when the component is integrated into the electric machine and which includes a sharp-edged structure; and
a polymer layer adhering to the flat region without further aid such as to mask the sharp-edged structure and thereby protect from damage the electric line on the flat region, said polymer layer being made of cured plastic adhesive and jetted onto the flat region in the form of threads, such that the threads are spin-coated on top of one another in the form of overlapping loops and form a network structure which spans the sharp-edged structure.

2. The component of claim 1, wherein the component is embodied as a stator including a winding overhang on a connection side, said flat region being arranged on an end winding of the winding overhang, with a section of the electric line lying on the flat region and fixed to the winding overhang by the polymer layer.

3. The component of claim 2, wherein the polymer layer covers the section of the electric line.

4. The component of claim 2, wherein the plastic adhesive is jetted in the form of threads onto the flat region containing the section of the electric line lying thereon, such that the threads are spin-coated on top of one another in the form of overlapping loops and form a network structure.

5. The component of claim 1, wherein the component is embodied as a stator or a rotor or a housing.

6. The component of claim 1, wherein the plastic adhesive is a thermoplastic hot melt adhesive.

7. The component of claim 6, wherein the thermoplastic hot melt adhesive is a polyolefin or a polyamide.

8. An electric machine, comprising a component, said component comprising a flat region in which an electric line runs when the component is integrated into the electric machine and which includes a sharp-edged structure, and a polymer layer adhering to the flat region without further aid such as to mask the sharp-edged structure and thereby protect from damage the electric line on the at least one flat region, said polymer layer being made of cured plastic adhesive and jetted onto the flat region in the form of threads, such that the threads are spin-coated on top of one another in the form of overlapping loops and form a network structure which spans the sharp-edged structure.

9. The electric machine of claim 8, wherein the component is embodied as a stator including a winding overhang on a connection side, said flat region being arranged on an end winding of the winding overhang, with a section of the electric line lying on the flat region and fixed to the winding overhang by the polymer layer.

10. The electric machine of claim 9, wherein the polymer layer covers the section of the electric line.

11. The electric machine of claim 9, wherein the plastic adhesive is jetted in the form of threads onto the flat region containing the section of the electric line lying thereon, such that the threads are spin-coated on top of one another in the form of overlapping loops and form a network structure.

12. The electric machine of claim 8, wherein the component is embodied as a stator or a rotor or a housing.

13. The electric machine of claim 8, wherein the plastic adhesive is a thermoplastic hot melt adhesive, in particular a polyolefin or a polyamide.

14. The electric machine of claim 8, wherein the component is embodied as a housing and the flat region is embodied as a region of the housing with an aperture, and further comprising an electric line runs through the aperture, wherein the polymer layer including the cured plastic adhesive spans and seals the aperture and adheres both to the electric line and to the housing.

15. A method for creating a polymer layer adhering to a flat region of a component of an electric machine, with an electric line running on the flat region when the component is integrated into the electric machine and the flat region including a sharp-edged structure, said method comprising:
creating with a nozzle a thread of a thermoplastic hot melt adhesive; and
while the thread is created, moving the nozzle in such a way that the thread is applied onto the flat region in layers and covering the whole area so that the thread is spin-coated in the form of overlapping loops, in order to form a network structure, with the network structure spanning the sharp-edged structure in order to protect from damage the electric line on the flat region.

16. The method of claim 15, wherein the thread is applied in the form of slings.

17. The method of claim 15, wherein the thermoplastic hot melt adhesive is fed to the nozzle at an operating pressure of between 1 bar and 10 bar.

18. The method of claim 15, wherein the thermoplastic hot melt adhesive is fed to the nozzle at an operating temperature of between 180° C. and 220° C.

19. The method of claim 15, wherein the thermoplastic hot melt adhesive is applied fully automatically.

20. The method of claim 15, wherein the thermoplastic hot melt adhesive is applied fully automatically using a robot.

* * * * *